United States Patent
Ringdahl et al.

(10) Patent No.: US 10,439,988 B2
(45) Date of Patent: Oct. 8, 2019

(54) ON PREMISES, REMOTELY MANAGED, HOST COMPUTERS FOR VIRTUAL DESKTOPS

(71) Applicant: VMware, Inc., Palo Alto, CA (US)

(72) Inventors: Kenneth N. Ringdahl, Pelham, NH (US); Anthony Alvino, Jr., Haverhill, MA (US); Daniel B. Allan, Hudson, NH (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/465,551

(22) Filed: Aug. 21, 2014

(65) Prior Publication Data
US 2015/0058969 A1 Feb. 26, 2015

Related U.S. Application Data

(60) Provisional application No. 61/991,975, filed on May 12, 2014, provisional application No. 61/868,168, filed on Aug. 21, 2013.

(51) Int. Cl.
*H04L 29/06* (2006.01)

(52) U.S. Cl.
CPC .............................. *H04L 63/0272* (2013.01)

(58) Field of Classification Search
CPC .................................................. H04L 63/0272
See application file for complete search history.

(56) References Cited

U.S. PATENT DOCUMENTS

| | | |
|---|---|---|
| 8,010,676 B1 | 8/2011 | Battersby et al. |
| 8,170,123 B1 | 5/2012 | Hobgood et al. |
| 8,281,377 B1 | 10/2012 | Snow et al. |
| 8,335,703 B1 | 12/2012 | Pulier et al. |
| 8,725,886 B1 | 5/2014 | Pulier et al. |
| 8,745,236 B2 | 6/2014 | Battersby et al. |
| 8,910,156 B1 * | 12/2014 | Kenchammana-Hosekote ............ G06F 9/45533 718/1 |

(Continued)

OTHER PUBLICATIONS

"Citrix Announces Workspace Services, Cloudbased Platform for DaaS, Virtual App Delivery and Mobility," dated May 6, 2014, as printed from http://www.citrix.com/news/announcements/may-2014/workspace-services-announcement.html, on Dec. 31, 2014.

(Continued)

*Primary Examiner* — Mohammad A Siddiqi
(74) *Attorney, Agent, or Firm* — Fish & Richardson P.C.

(57) ABSTRACT

Virtual desktops are hosted on one or more remote desktop hosts at one or more private locations of an enterprise, remote from a service provider location, and behind a firewall on a private computer network. The desktops are remotely managed through resources at a service provider data center, optionally along with other virtual desktops hosted on desktop hosts at the service provider data center. The remote desktop hosts can be pre-configured with known storage, compute and connectivity resources. The remote desktop hosts can be remotely managed through a resource management appliance, i.e., a management system running resource management software, which can be located at either the service provider data center or the tenant data center.

20 Claims, 7 Drawing Sheets

(56) References Cited

U.S. PATENT DOCUMENTS

| | | | | |
|---|---|---|---|---|
| 9,015,712 | B1* | 4/2015 | Hodge | G06F 9/455 717/174 |
| 9,614,748 | B1* | 4/2017 | Battersby | H04L 45/02 |
| 2010/0257269 | A1* | 10/2010 | Clark | G06F 9/4856 709/226 |
| 2011/0075674 | A1* | 3/2011 | Li | H04L 12/5695 370/401 |
| 2011/0142053 | A1* | 6/2011 | Van Der Merwe | H04L 47/72 370/395.1 |
| 2011/0185064 | A1* | 7/2011 | Head | G06F 9/5077 709/226 |
| 2012/0096271 | A1* | 4/2012 | Ramarathinam | H04L 63/0807 713/172 |
| 2012/0151057 | A1* | 6/2012 | Paredes | H04L 12/4641 709/225 |
| 2012/0179820 | A1* | 7/2012 | Ringdahl | G06F 8/63 709/225 |
| 2012/0213294 | A1 | 8/2012 | Hobgood et al. | |
| 2012/0227085 | A1 | 9/2012 | Battersby et al. | |
| 2013/0046976 | A1* | 2/2013 | Rosati | H04L 9/3271 713/168 |
| 2013/0159021 | A1* | 6/2013 | Felsher | G06F 19/322 705/3 |
| 2013/0174242 | A1 | 7/2013 | Snow et al. | |
| 2013/0212282 | A1 | 8/2013 | Pulier et al. | |
| 2013/0235874 | A1* | 9/2013 | Ringdahl | H04L 12/4641 370/395.53 |
| 2013/0332614 | A1* | 12/2013 | Brunk | H04L 67/1097 709/226 |
| 2013/0332982 | A1* | 12/2013 | Rao | H04L 63/08 726/1 |
| 2014/0280979 | A1 | 9/2014 | Battersby et al. | |
| 2014/0282871 | A1* | 9/2014 | Rowland | H04L 63/20 726/3 |
| 2014/0304322 | A1* | 10/2014 | Dey | H04L 67/141 709/203 |
| 2017/0126787 | A1* | 5/2017 | Martinez | H04L 67/10 |

OTHER PUBLICATIONS

"Desktone Launches Industry's Only Desktop Virtualization Solution that Offers Choice across Public, Private and Hybrid Clouds", dated May 13, 2013, as printed from http://www.desktone.com/about_us/press/139-desktone_launches_industrys_only_desktop/view, on Dec. 31, 2014.

"Desktone and GreenBytes Partner to Deliver On-Premises, Cloud-Managed Virtual Desktops", dated May 13, 2013, as printed from http://www.desktone.com/about_us/press/140-desktone_and_greenbytes_partner_to_deliver/view, on Dec. 31, 2014.

* cited by examiner

ON PREMISES, REMOTELY MANAGED, HOST COMPUTERS FOR VIRTUAL DESKTOPS

CROSS-REFERENCE TO RELATED APPLICATIONS

This application is a nonprovisional application of provisional application Ser. No. 61/868,168, filed Aug. 21, 2013, which is hereby incorporated by reference.

This application also is a nonprovisional application of provisional application Ser. No. 61/991,975, filed May 12, 2014, which is hereby incorporated by reference.

BACKGROUND

Service providers have made computer systems available through which a full computer resource, such as virtual computing machine running several applications on an operating system with compute, storage and network resources, can be made available to end users remotely over a computer network. Such systems are commonly called "virtual desktops" or remote desktops. Virtual desktops are run on one or more computers, called desktop hosts, which are hosted by the service provider.

In enterprises, such virtual desktops generally need to have access to resources on an enterprise's computer network. Service providers also typically have multiple enterprises as customers, also called tenants. Generally speaking, virtual desktops for one tenant are associated with a virtual private network for that tenant, while virtual desktops for another tenant are associated with a different virtual private network for the other tenant. For both tenants, the desktop hosts that host the virtual desktops are connected to a resource management appliance on a management host at a service provider's facility and are connected to a service provider network to allow the service provider to provision virtual desktops on those desktop hosts. A tenant appliance on the management host allows the tenant to manage the provisioned virtual desktops.

For some enterprises, using virtual desktops hosted at a service provider outside of the enterprise's private computer network can create security or regulatory issues. The service provider network might be considered an untrusted network. Service provider-hosted virtual desktops also can be an issue wherein significant data transfer loads exist between the virtual desktops and other resources in the enterprise network. In particular, some applications on the virtual desktop can generate or consume large amounts of data. Also, having an additional computer network to connect an end user's local device to a virtual desktop on a desktop host which in turn connects to enterprise resources can introduce latency and potential connectivity issues that do not arise with desktop computers connected directly to the enterprise network.

SUMMARY

This Summary introduces selected concepts in simplified form that are further described below in the Detailed Description. This Summary is intended neither to identify key or essential features of the claimed subject matter, nor to limit the scope of the claimed subject matter.

Virtual desktops are hosted on one or more remote desktop hosts at one or more private locations of an enterprise, remote from a service provider location, and behind a firewall on a private computer network, which is not at the service provider network. However, the remote desktop hosts are remotely managed through resources on the service provider network, optionally along with other virtual desktops hosted on desktop hosts on the service provider network. The remote desktop hosts can be pre-configured with known storage, compute and connectivity resources, which a service provider can remotely manage through a resource management appliance, i.e., service provider management software running on a management host at the service provider data center or at the enterprise's location and in communication with a management host at the service provider data center.

A tenant also can remotely manage provisioned virtual desktops using a tenant appliance, i.e., tenant management software running on the management host at the service provider data center.

Thus, computing resources and software for managing the desktop hosts are on a service provider network. Such resources may be divided between the service provider network and the tenant network such that hosts and desktops can be managed through locally-deployed management hosts which communicate with remote management hosts on the service provider network which aggregate management information across the enterprise. Additionally, desktop hosts supporting virtual desktops and remote access gateways, managing connections between end point devices and the virtual desktops, are on the tenant network.

In one implementation, the service provider network can be extended through a virtual private network into the enterprise facility, through a dedicated router and switch, solely to connect the resource management appliance to the remote desktop host for managing the remote desktop host. The virtual desktops on the remote desktop host and a remote access gateway are connected to the enterprise's private network behind its firewall and have a separate persistent network connection extended back to the service provider premises through a virtual private network where the tenant appliances are hosted on a virtual private network dedicated to the tenant.

As an alternative to extending the service provider network to the tenant data center for management of the infrastructure, an access gateway can be leveraged to proxy connections to a management appliance that then communicates with the infrastructure, such as the desktop hosts. The access gateway can connect to a public network on one side, and the tenant network on the other side, and not store or process data within the gateway, commonly called a DMZ gateway. In this configuration, the service provider site to site connection is not used. A management appliance can be placed on the tenant network, on-premises. Thus logically there are at least two network connections mapped to the management appliance, and the access gateway is on a separate network such that it does not access the tenant resources directly. Management instructions are sent to the access gateway, which acts as a proxy to pass the instructions to the management appliance. The management appliance also can serve as a failover appliance should the connection between the tenant and the service provider become unavailable. This failover functionality ensures that core management functionality, such as brokering to a desktop session, remains accessible even if the remote management by the service provider is unavailable.

A service provider can offer remote, private or hybrid virtual desktop infrastructures to its tenants. That is, some tenants may have desktop hosts residing solely at the service provider. Other tenants may have desktop hosts residing solely at an enterprise location on a private computer network separate from the service provider. Some tenants may have both service provider-based desktop hosts and on-premises desktop hosts. On premises desktop hosts may reside at different locations which can have separate management appliances that communicate with management hosts on the service provider network.

Some of the technical problems to be addressed in providing such a system is ensuring a primary connection between the resource management appliance at the service provider facility and the remote desktop hosts; and ensuring a secondary connection between the tenant appliance in the service provider data center and the virtual desktops and remote access gateway that are hosted on the enterprise network. In some implementations, the functionality of the tenant appliance can be divided so that enterprise-wide management information is maintained on a tenant appliance at a service provider and desktop management functions can be performed by management appliances on the tenant network at the tenant site. Similarly, resource management functions can be divided between maintaining enterprise-wide management functions on a management host at the service provider, and resource management functions can be performed by management appliances on the tenant network at the tenant site.

With such implementations, when a user for an enterprise requests access to a virtual desktop, the user can be on the enterprise network or remote, and may be authorized to use a virtual desktop hosted on a desktop host by the service provider or hosted on the on-premises desktop host on the enterprise's network. The desktop host to be selected by the tenant appliance or desktop manager for hosting a virtual desktop for that user can depend on the user's location, permissions to use various applications outside of the enterprise network, and available resources. A best-fit algorithm can be applied selecting between the service provider hosted desktops and the enterprise hosted desktops as if the selection is being done between two data centers.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which an on-premises desktop host with remote desktop management can be implemented.

Figure 1:
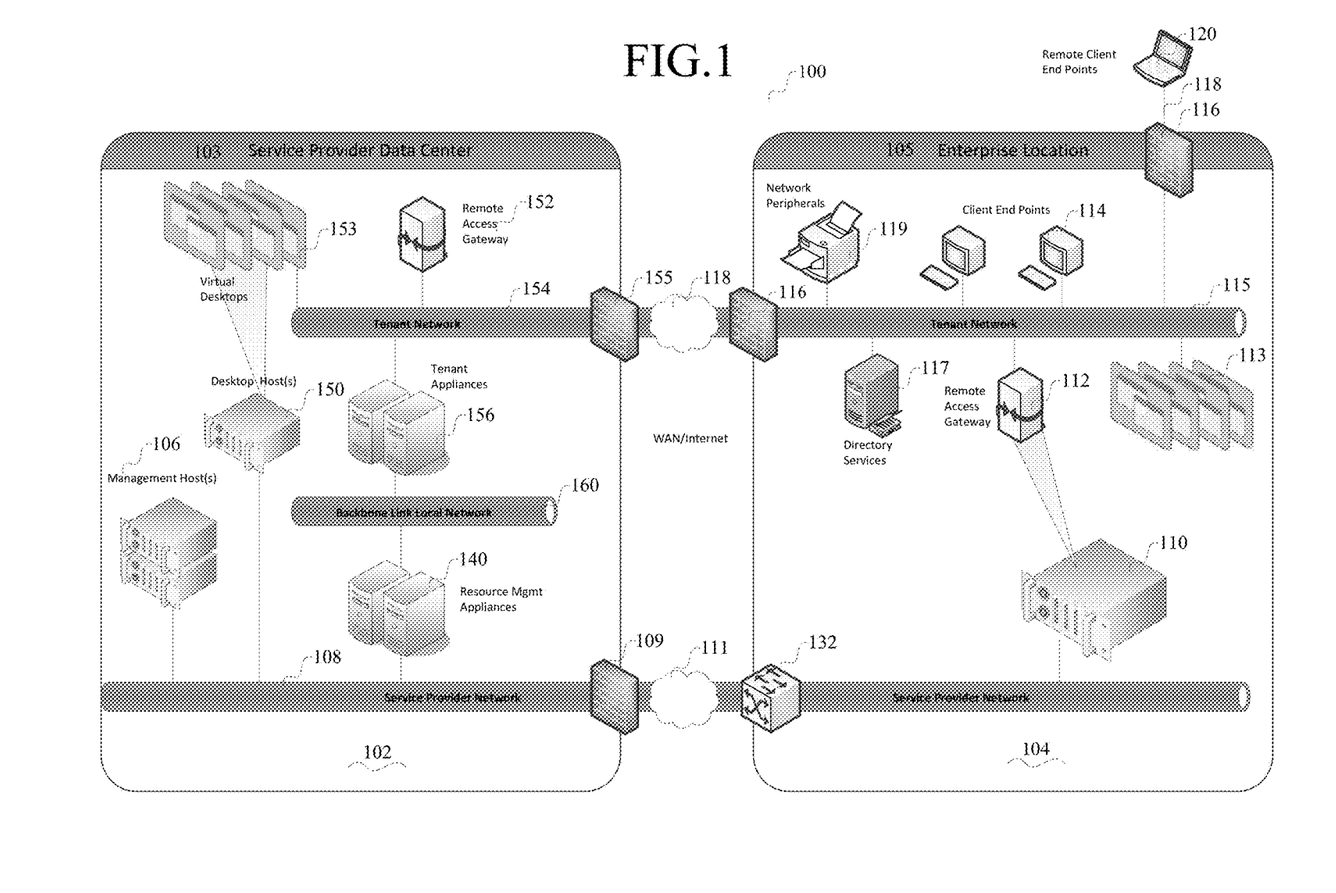
FIG. 1 is a block diagram of an example system using an on-premises desktop host.

Referring to FIG. 1, a system 100 includes a service provider computer system 102 at a service provider data center 103 and an enterprise computer system 104 at an enterprise location 105 (also called a tenant location, if the enterprise is a customer of the service provider).

The service provider computer system 102 includes one or more management hosts 106 that support tenant appliances 156 (described in more detail below) that connect to a tenant network 154 and resource management appliances 140 that connect to a service provider computer network 108. These appliances 156, 140 are virtual machines running on the management hosts 106. A backbone network 160 connects tenant appliances and resource management appliances. The management hosts 106 can be highly available implementations of a computer; an example computer is described below in connection with FIG. 6.

There is a connection from the service provider network, through a firewall 109, to a publicly accessible computer network 111. There also is a connection, through a firewall 155 from the tenant network 154 to a publicly accessible computer network 118, which implements a virtual private network that extends the enterprise's computer network from its enterprise location 150. Both networks 111 and 118 can be the public Internet.

The enterprise computer system 104 includes a remote desktop host 110, supporting a plurality of virtual desktops 113 that connect to an enterprise computer network 115. The remote desktop host 110 also supports a remote access gateway 112 that manages connections from other computers to the virtual desktops 113. The remote access gateway 112 has an external, public facing IP address for the public network 111, 118, and an internal IP address in the enterprise's network address space. The enterprise computer network 115 interconnects various resources, such as directory services 117, network peripherals 119 such as printers, and other resources such as databases, storage, and the like, to computers, including virtual desktops 113 and other locally connected computers, called local client end points 114.

The enterprise computer network 115 also includes one or more firewalls 116 through which a connection to a publicly accessible computer network 118, such as the Internet, is provided, establishing a virtual private network extending the enterprise network. A remote client end point 120 can access a virtual desktop 113 on the remote desktop host 110 by connecting either to the enterprise computer network 115 through a publicly accessible computer network using a virtual private network (VPN—not shown), or through the remote access gateway 112 running on the remote desktop host.

The remote desktop host 110, in essence, supports one or more virtual desktops 113 residing on the enterprise computer network 115. The virtual desktops are accessible by client end points 114, 120 over the enterprise computer network, over the publicly accessible computer network though a virtual private network extending the enterprise computer network, or through the remote access gateway 112 hosted on the remote desktop host 110. The virtual desktops 113 are used by users on the client end points to access the resources on the enterprise computer network.

In one implementation, the resource management appliance 140 can connect through a virtual private network that extends the service provider network 108 to the remote desktop hosts 110. Such an extension of the network can be done through a dedicated router and switch 132 connected to the public network 111 which only permits resource management traffic, from the service provider network 108 and received over the public network 111, to pass to the remote desktop host 110. Such a connection enables the resource management appliance 140 to provision virtual desktops 113 on the one or more remote desktop hosts 110. The virtual desktops use resources on the enterprise computer network behind the firewall with respect to the publicly accessible computer network 111 and the service provider computer network 108. The resource management software on the resource management appliances 140 is able to provision and manage such resources for a virtual desktop on the one or more remote desktop hosts, yet not access the enterprise resources and network and virtual desktops on the remote desktop hosts.

As an alternative to extending the service provider network to the tenant data center for management of the infrastructure, an access gateway located can be leveraged to proxy connections to the infrastructure, such as the desktop hosts. In this configuration, the service provider site to site connection is not used. The access gateway can connect to a public network on one side, and the tenant network on the other side, and not store or process data within the gateway, commonly called a DMZ gateway. A management appliance can be placed on the tenant network, on-premises. Thus logically there are at least two network connections mapped to the management appliance, and the access gateway is on a separate network such that it does not access the tenant resources directly. Management instructions are sent to the access gateway, which acts as a proxy to pass the instructions to the management appliance. An example of such an implementation is described in more detail below in connection with FIG. 7.

The management appliance also can serve as a failover appliance should the connection between the tenant and service provider become unavailable. This failover functionality ensures that core management functionality, such as brokering to a desktop session, remains accessible even if the remote management by the service provider is unavailable.

The tenant appliance 156 is the tenant software executing on a host residing at the service provider for managing virtual desktops and encompasses the features and function for brokering users to desktops, allocating sessions to users on-demand, managing the session state for active and disconnected sessions, as well as hosting the tenant facing web user interface and web services for that tenant.

The remote desktop host 110 thus has at least one physical network connection for connection to an enterprise computer network 115, and at least one physical network connection for connection to the service provider computer network 108 over a VPN through a dedicated router 132 connected to a public network 111. The remote desktop host 110 is responsive to instructions from the resource management appliance 140 received over the service provider computer network 108 for provisioning virtual desktops 113 on the remote desktop host 110. The virtual desktops are provisioned with resources including network access to the enterprise computer network 115. Each virtual desktop is configured to be accessed by client end points 120 and 114 that can connect to the enterprise computer network 115 or through the remote access gateway 112. Local client computers 114 on the enterprise computer network also can connect to the remote desktop host to access a virtual desktop.

A tenant also can have virtual desktops 153 and a remote access gateway 152 hosted on desktop hosts 150 residing at the service provider data center 103. These virtual desktops 153 connect to a virtual private network for the tenant, indicated at 154, which connects over the public network 118 to the enterprise network 115. The resource management appliances 140 can provision and manage virtual desktops 153 running on the desktop hosts 150 over the backbone network 160. These virtual desktops 153 can be managed by a tenant using tenant appliance 156. The connection between the tenant appliance and resource management appliance over the backbone network 160, and the connection between the resource management appliance and the desktop host 110, do not permit service provider access to the tenant network or the virtual desktops 153 running on the desktop hosts 150.

Given this context, a more detailed example implementation for a service provider with multiple tenants will be described in more detail in connection with FIG. 2. Some of the structures are duplicated from the system shown in FIG. 1 and thus may not be described again. A service provider data center 200 includes a backbone network 202 that connects service provider resource manager appliances 206 to tenant appliances 210 and 212 for managing virtual desktops for tenants, herein indicated as tenant A and Tenant B. The backbone network 202 allows the resource manager appliances 206 to communicate with tenant appliances, without connecting the tenant appliances to the primary service provider network 214, or to other tenant networks.

The resource manager appliance 206 can be implemented as a virtual machine running on a highly available management host (not shown) with software that allows virtual desktops to be provisioned on remote desktop hosts 244, 264 and other desktop hosts 230, 232 to be provisioned in the service provider data center through connections on the service provider network 214.

Each tenant has its own enterprise computer network, shown as tenant A network 240 and tenant B network 260 to which tenant resources such as printers, storage, databases, directory services and network services are connected. A remote access gateway 242, 262 is connected to each of the tenant networks 240, 260. The remote access gateway implements the mechanism for connecting a user's end point to a virtual desktop assigned to the user on the remote desktop hosts 244, 264, such as described in U.S. Pat. No. 8,281,377. The enterprise computer network 240, 260 is connected to the virtual desktops 246, 266, 231, 233 for the enterprise. Such desktops can be hosted on a remote desktop host 244, 264, as indicated at 246, 266, or can be hosted on desktop hosts 230,232, as indicated at 231, 233, at the service provider data center 200.

The connection between the service provider hosted desktops 231, 233 and the tenant network 240, 260 is through a virtual private network that extends the enterprise computer network into the service provider data center. The connection between the remote desktop host and the service provider network can be made through a virtual private network that extends the service provider network 214 into enterprise locations through a dedicated switch and router 245, 265 and allows the resource management appliance 206 to provision resources for a virtual desktop on the one or more remote desktop hosts, yet not access such resources. Alternatively, an access gateway can be configured as a DMZ gateway on-premises to proxy connections to a management appliance that then communicates with the infrastructure, as will now be described in connection with FIG. 7.

Figure 7:
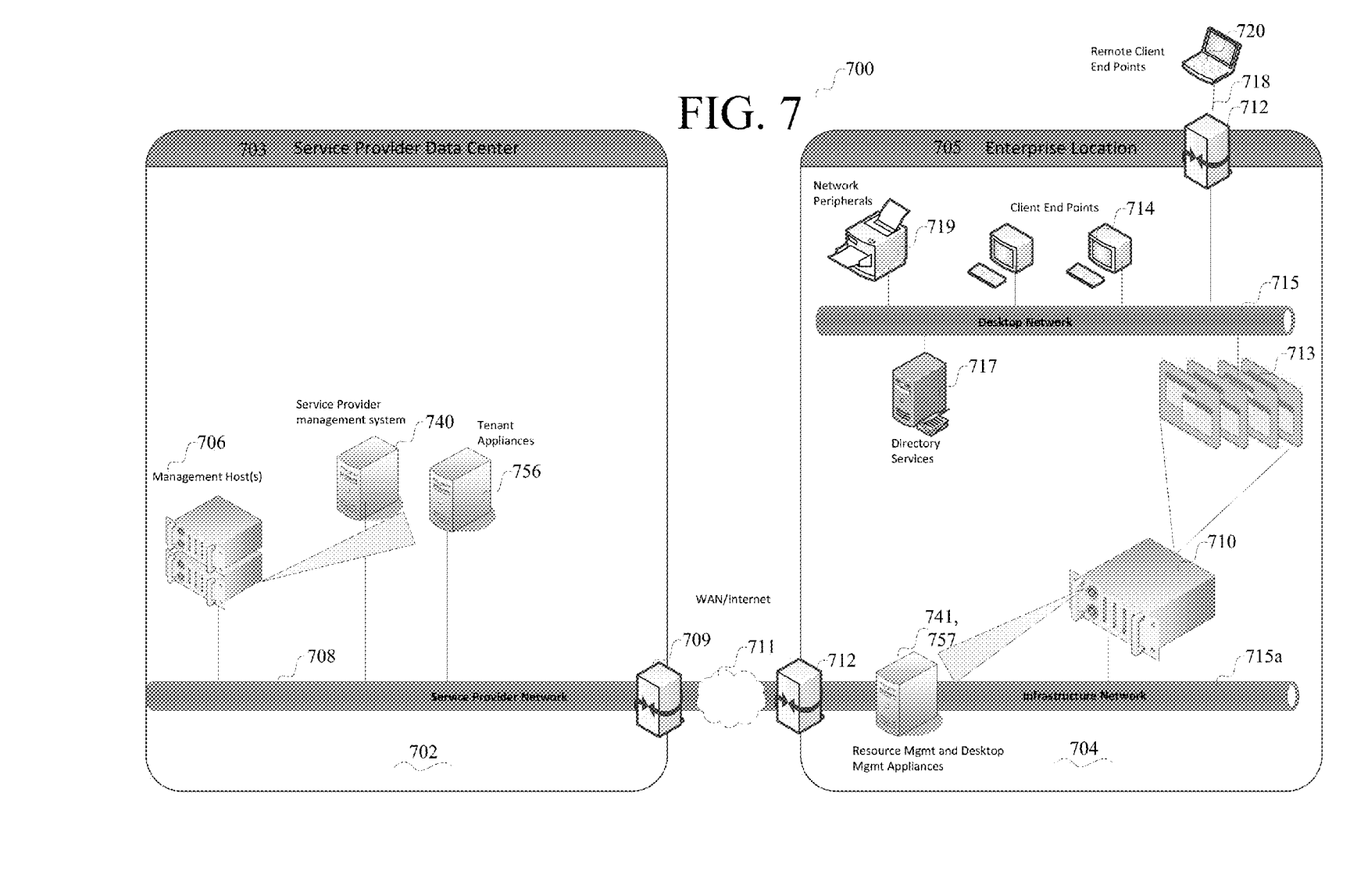
FIG. 7 is a block diagram of another example implementation of a system with on-premises desktop hosts that are remotely managed.

Referring now to FIG. 7, a system 700 includes a service provider computer system 702 at a service provider data center 703 and an enterprise computer system 704 at an enterprise location 705 or tenant location.

The service provider computer system 702 includes one or more management hosts 706 that support tenant appliances 756 (described in more detail below) and service provider management appliances 740 that connect to a service provider computer network 708. These appliances 756, 740 are virtual machines running on the management hosts 706. The management hosts 706 can be highly available implementations of a computer; an example computer is described below in connection with FIG. 6.

The management appliances 756, 740 on the service provider network communicate with appliances on the tenant network 715/715*a*, through access gateway 712, over a publicly accessible computer network 711, which can be the Internet. The tenant network can have a desktop network 715 on which enterprise resources and desktops communicate, and an infrastructure network 715*a* on which desktop hosts and management appliances at the enterprise location communicate. Alternatively, the desktop network and infrastructure network can be the same computer network.

The enterprise computer system 704 includes one or more desktop hosts 710, supporting a plurality of virtual desktops 713 that connect to the desktop network 715. The desktop host 710 also can support the gateway 712. Gateway 712 manages connections from other computers to the virtual desktops 713 and provides an interface for connecting with management appliances on the service provider computer network. The access gateway 712 has an external, public facing IP address for the public network 711 and an internal IP address in the enterprise's network address space. The desktop network 715 interconnects various resources, such as directory services 717, network peripherals 719 such as printers, and other resources such as databases, storage, and the like, to computers, including virtual desktops 713 and other locally connected computers, called local client end points 714.

The desktop host 710 supports one or more virtual desktops 713 residing on the desktop network 715. The virtual desktops are accessible by client end points 714 over the desktop network. Remote client end points 720 also can access a virtual desktop 713 on the remote desktop host 710 by connecting to the desktop network 715 through a publicly accessible computer network 718 through the access gateway 712. The virtual desktops 713 are used by users on the client end points to access the resources on the enterprise computer network.

In one implementation, a resource management appliance 741 connects to the management interface of desktop host 710 through the infrastructure network 715*a*, which can be a network dedicated to resource management and not directly connected to the tenant network. The resource management appliance 741 can communicate with a service provider management appliance 740 through a secure connection, such as by using secure socket layer (SSL) communications, over the public network 711 through gateway 709. The resource management appliance 741 can provision virtual desktops 713 on the one or more desktop hosts 710 and report the provisioning information to the service provider management appliance 740. With multiple tenant locations and multiple resource management appliances for a tenant (not shown), the service provider management appliance 740 aggregates provisioned virtual desktop information across the tenant's locations. The virtual desktops use resources on the enterprise computer network behind the gateway 712 with respect to the publicly accessible computer network 711 and the service provider computer network 708. The resource management software on the resource management appliances 741 is able to provision and manage such resources for a virtual desktop on the one or more desktop hosts 710.

Thus, in comparison to the implementation shown in FIG. 1, in this configuration, the site to site connection and virtual private networks between the service provider and tenant locations can be eliminated. The resource management appliance 741 is placed on the tenant network, on-premises, and relays infrastructure requests to the service provider management appliance 740 through gateway 709 over the public network 711. The resource management appliance can be placed on a separate infrastructure network (715*a*), on premises, that does not directly access the desktop network 715. Management instructions from the service provide management appliance 740 can be sent securely over the public computer network through access gateway 712 to the resource management appliance 741.

The tenant appliance 756 is a virtual machine executing tenant software on a management host 706 and residing at the service provider for managing virtual desktops and encompasses the features and functions for hosting the tenant facing web user interface and web services for that tenant. The tenant appliance passes on instructions to desktop manager appliances 757 residing on tenant sites through gateway 712 to perform brokering and provisioning operations. In turn desktop managers allocate sessions to users on demand and manage session state for active and disconnected sessions. Information about the usage of desktops is reported by the desktop manager 757 to the tenant appliance for that tenant using secure communication protocols over the public computer network 711 through gateway 709.

The desktop host 710 thus has at least one physical network connection for connection to the desktop network 715. If there is a separate infrastructure network 715*a*, then the desktop host 710 also has at least one physical network connection for connections to infrastructure network 715*a* and the management appliances 741, 757. The desktop host 710 is responsive to instructions from the resource management appliance 740 for provisioning virtual desktops 713 on the desktop host 710. The virtual desktops are provisioned with resources including network access to the desktop network 715. Each virtual desktop is configured to be accessed by client end points 720 that can connect through the access gateway 712 or by local client computers 714 that can connect through the desktop network 715.

As in FIG. 1, a tenant also can have virtual desktops hosted at the service provider location. If the tenant has multiple locations, the resource manager 741, desktop manager 757 and desktop hosts 710 can be replicated at the multiple locations. A tenant also may have desktop hosts at the service provider location as shown in FIG. 1. In such an implementation, the tenant appliance 756 and service provider management appliance 740 aggregate data from the resource managers 741 and desktop managers 757 for each tenant.

Figure 2:
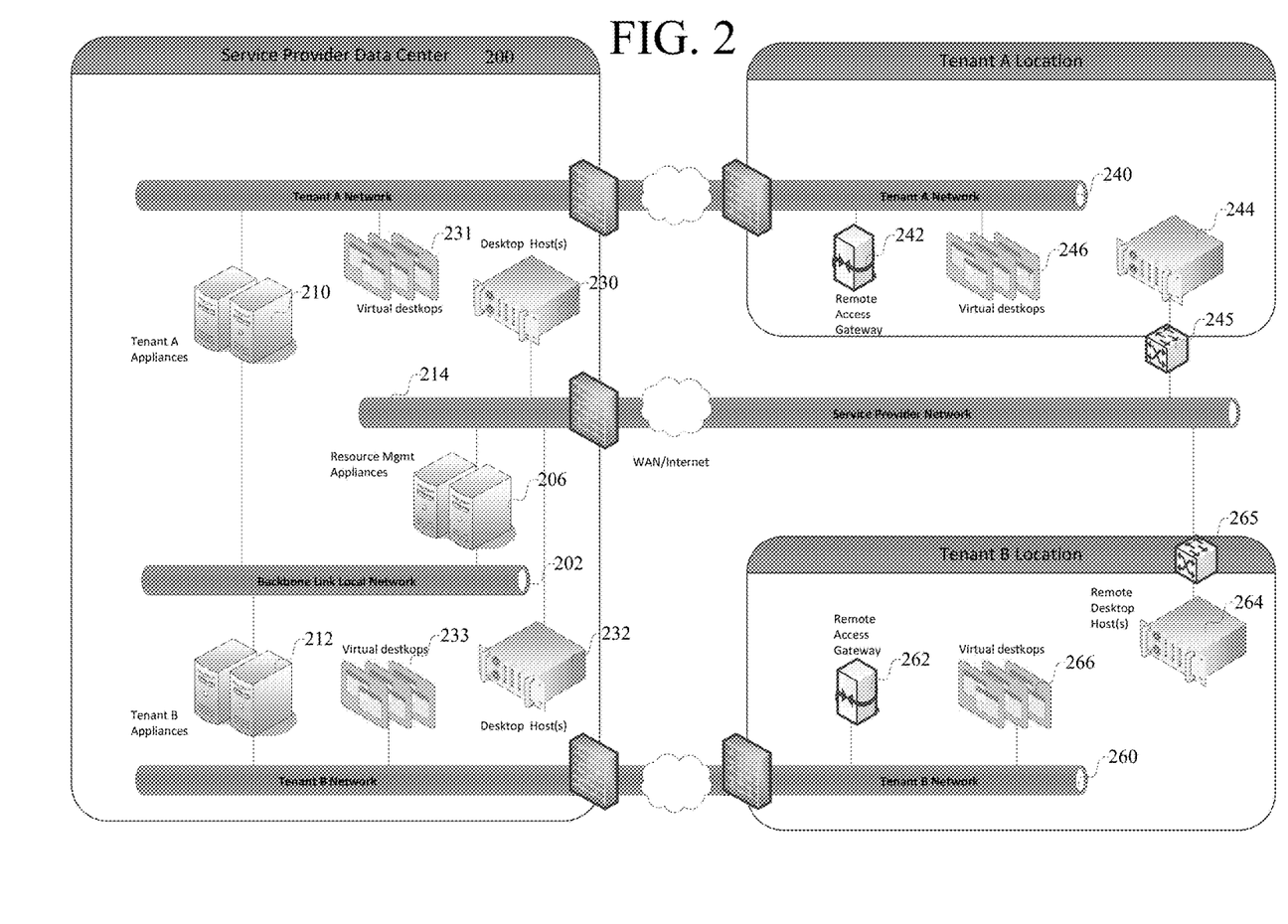
FIG. 2 is a more detailed block diagram illustrating an example implementation of a multitenant system.

A duplication of architecture for multiple tenants, similar to what is shown in FIG. 2, can be applied to support multiple tenants.

A service provider can offer remote, private or hybrid virtual desktop infrastructures to its tenants. That is, some tenants may have desktop hosts residing solely at the service provider. Other tenants may have desktop hosts residing solely at an enterprise location on a private computer network separate from the service provider. Some tenants may have both service provider-based desktop hosts and on-premises desktop hosts. Some tenants may have multiple locations with on-premises desktop hosts that are managed separately at the local level, but managed together remotely through the management systems hosted at the service provider.

Figure 6:
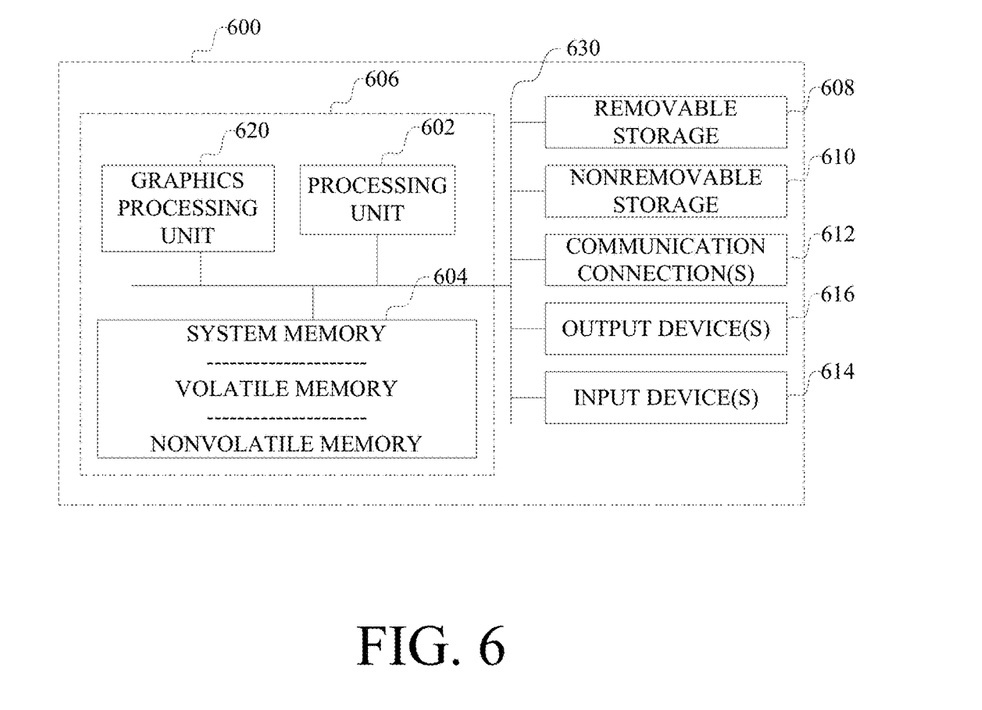
FIG. 6 is a block diagram of an example computer system.

As an example implementation, the on-premises desktop host includes both compute and storage resources in a form factor such as typical for a rack mounted server computer, and has a basic configuration of a computer as described in FIG. 6. As an example implementation, the remote desktop host can include a large number, e.g., 12, of processing cores, a large amount of random access memory, such as 192 GB of RAM, and local storage managed by VMware Virtual SAN (e.g. vSAN). The software running on the desktop host can include the remote access gateway software (shown separately in FIG. 2) and a hypervisor such as the VMware ESXi hypervisor with vSAN that enables the use of shared storage without the cost of additional hardware.

Given a system as configured above, the process of configuring the system, provisioning virtual desktops for users, and connecting a user to a virtual desktop will now be described in more detail. Generally speaking, after a remote desktop host is installed at the tenant site, the remote desktop host is registered to the tenant on the resource manager, whether located at the tenant site or the service provider. A remote access gateway can be provisioned on the remote desktop host. The tenant, through the tenant appliance, can request that virtual desktops be provisioned on the remote desktop host. This request passes through the resource manager appliance, which provisions the virtual desktops on the remote desktop host.

In connection with the implementation shown in FIGS. 1-2, the virtual desktops then connect to the tenant appliances. The virtual desktops are managed (allocation, state, brokering) by the tenant appliances. External allocation requests to the virtual desktops are routed through the remote access gateway.

Figure 3:
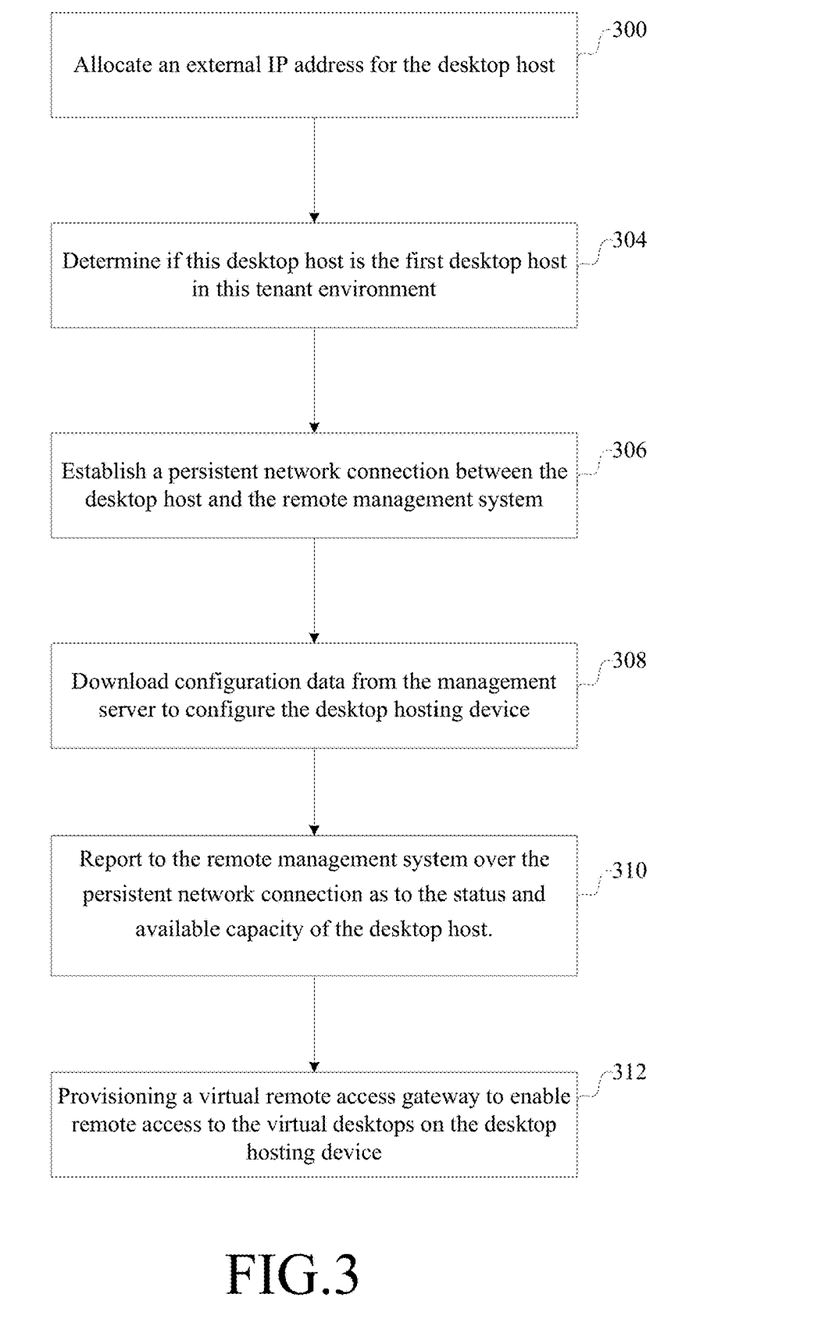
FIG. 3 is a flow chart of an example implementation of configuring a desktop appliance and remote management system.

To setup such a system, in an example implementation described in FIG. 3, the pre-configured desktop host is first installed at the tenant site and is connected to the tenant computer network. An external IP address for the desktop host is allocated 300. It is then determined at 304 if the desktop host is the first desktop host in the environment. For example, the resource manager can scan for neighbor desktop hosts operating on the tenant location and maintain an inventory of neighbor desktop hosts, such as in a database. A persistent network connection is established 306 between the desktop host and the resource management appliance. Configuration data is downloaded 308 from the resource management appliance to configure the desktop host. The desktop host then reports 310 to the resource management appliance over the persistent network connection as to the status and available capacity of the desktop host. A virtual remote access gateway is then provisioned 312, including being assigned its external and internal IP addresses, to enable remote access to the virtual desktops on the remote desktop host. The remote desktop host is configured to provision and manage desktops on a segment of a virtual network that is co-resident to the remote desktop host, where that segment includes a domain name services (DNS) server, dynamic host configuration protocol (DHCP) services, gateway services and directory services.

The provisioned virtual desktops then connect with the tenant appliance to allow the tenant to remotely manage them. An example implementation of this connection will now be described in connection with FIG. 4.

Figure 4:
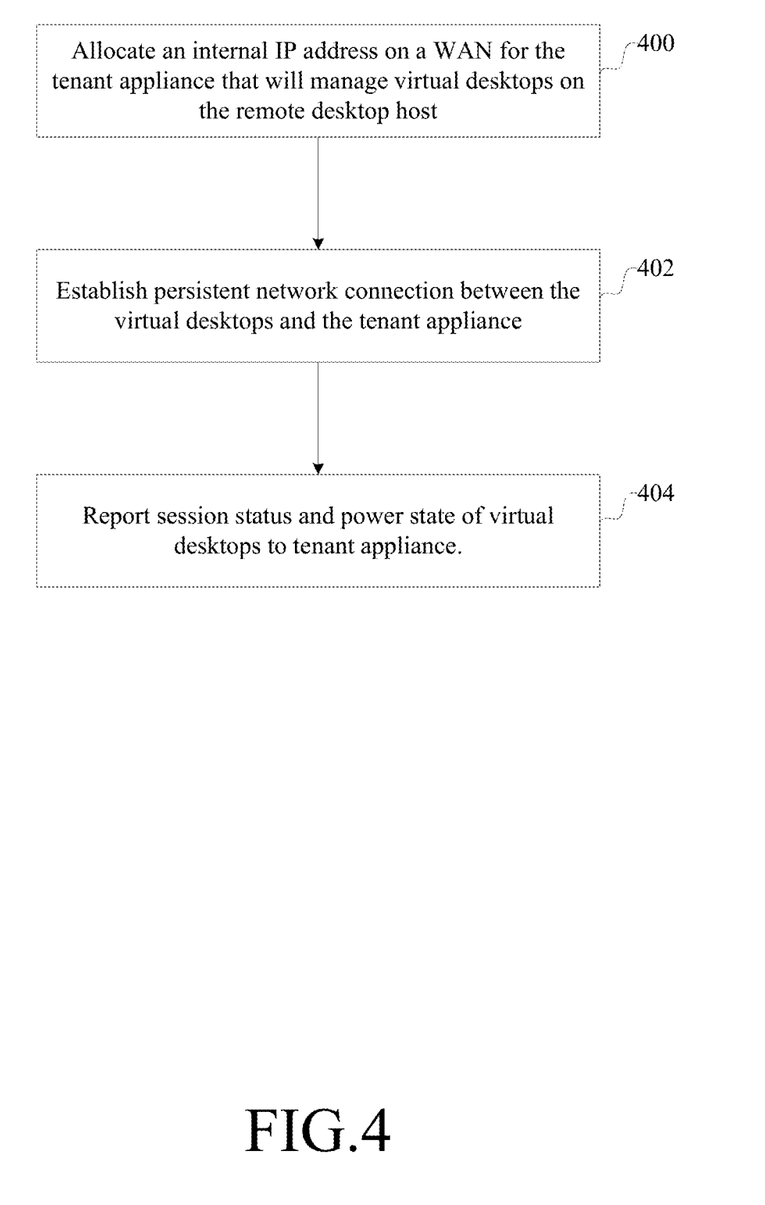
FIG. 4 is a flow chart describing how a desktop host is connected to the tenant appliance.

The virtual desktops use a network communication protocol to establish a WAN connection with the tenant appliance. In particular, an internal IP address is allocated 400 for the tenant appliance. The tenant appliance can be one of a plurality of tenant appliances on the WAN which manage a plurality of virtual desktops on the desktop host over a virtual private network connection. A network connection is established 402 between the virtual desktops and the tenant appliance. In this implementation, the connection is established, information is transferred and the connection is terminated. Alternatively, the connection can be a persistent network connection. The session status and power state of each virtual desktop is reported 404 to the tenant appliance over the network connection.

The virtual remote access gateway also is configured on-demand to enable direct access to the hosted virtual desktop when a user is remote to the environment. An example implementation of this will now be described in connection with FIG. 5.

Figure 5:
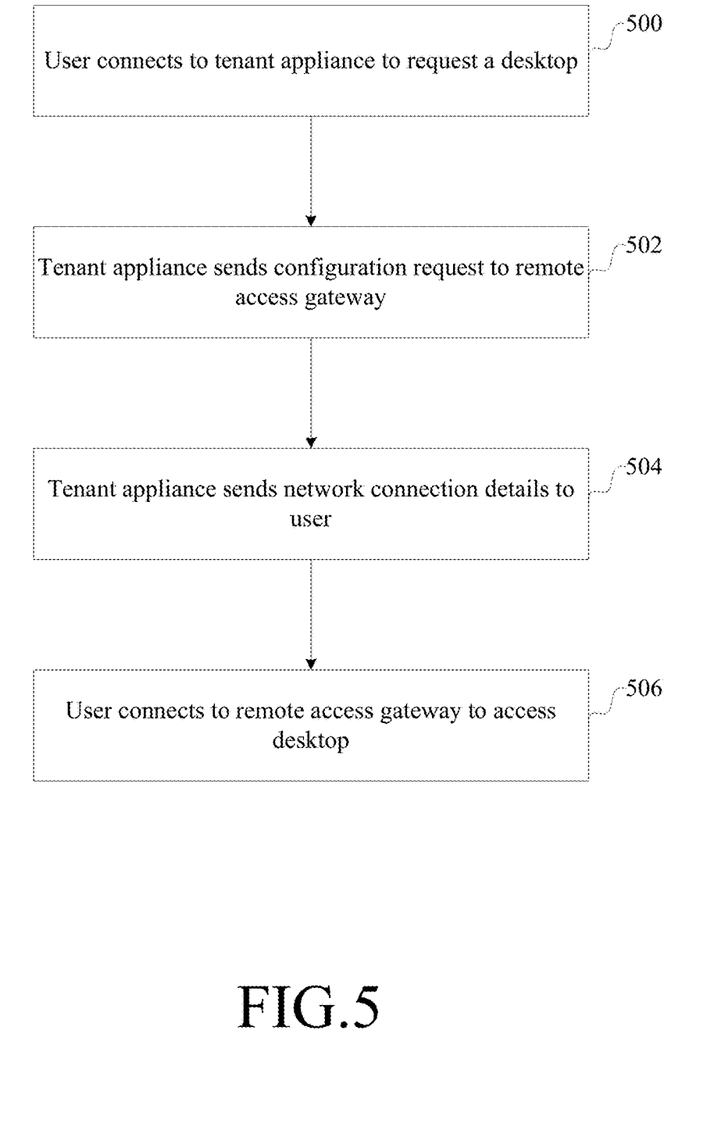
FIG. 5 is a flow chart describing how a user connects to a virtual desktop.

A user connects 500 to the tenant appliance across the WAN and requests a desktop allocation. The tenant appliance sends 502 a configuration request across the persistent network connection to the remote access gateway to expose an available port. The tenant appliance returns 504 the network connection details to the user of the remote access gateway. The user connects 506 to the remote access gateway which provides network address translation (NAT) and forwarding to the virtual desktop in a remote location from the tenant appliance.

With the implementation shown in FIG. 7, the process of configuring the system, provisioning virtual desktops for users, and connecting a user to a virtual desktop will now be described in more detail.

In the system in FIG. 7, the setup of desktops and desktop hosts involves installing a preconfigured desktop host at the tenant site and connecting the desktop host to the tenant network. A resource manager and desktop manager also are installed at the tenant site, optionally on the same desktop host, and connected to a tenant network so that they can communicate with the desktop host. Configuration data can be downloaded from the resource manager to the desktop host to configure the desktop host. The desktop host can report to the resource manager regarding its status and available capacity. The access gateway 712 also is configured with internal and external IP addresses to enable access to the virtual desktops on the desktop host, and for the management appliances at the service provider data center to communicate with the management appliances on the tenant site. Similarly, the management appliances at the tenant site are configured with IP addresses to access the access gateway of the service provider data center to allow communication with the management appliances at the service provider site.

After the resource manager is configured at the tenant location, the resource manager and the service provider management appliances can then communicate with each other, with the resource manager providing status information of available resources to the service provider management system. Also, after the desktop manager is configured at the tenant location, the desktop manager and tenant appliance can communicate with each other, with the desktop manager providing status information of provisioned desktops to the tenant appliance. The virtual desktops are managed (allocation, state, brokering) by the desktop manager, which communicates state of the desktops to the tenant appliance at the service provider location. External allocation requests from client end point devices to the virtual desktops are routed through the service provider access gateway initially to the tenant appliance, which communicates with the desktop manager for the desktop to be allocated; the client endpoint device then communicates with the allocated desktop through the enterprise access gateway.

Similar to FIG. 4, the virtual desktops in FIG. 7 use a network communication protocol to establish a LAN connection with the desktop manager, which in turn communicates using a secure communication protocol with the tenant appliance through the service provider access gateway. In particular, an internal IP address is allocated for the desktop manager. A connection is established between the virtual desktops and the desktop manager. In this implementation, the connection is established, information is transferred and the connection is terminated. Alternatively, the connection can be a persistent network connection. The session status and power state of each virtual desktop is reported to the desktop manager over this network connection.

The tenant access gateway also is configured to enable direct access to the hosted virtual desktop when a user is remote to the environment. An example implementation of this will now be described. Similar to what is shown in FIG. 5, a user connects to the tenant appliance across the WAN and requests a desktop allocation. The tenant appliance sends a configuration request to the desktop manager, which in turn requests the remote access gateway to grant access for the user. The tenant appliance also sends requests to the enterprise access gateway to perform authentication of the user, as in this implementation the tenant appliance does not have access to the authentication system of the tenant. The tenant appliance returns the network connection details to the user. The user connects to the remote access gateway which provides network address translation (NAT) and forwarding to the virtual desktop.

In one implementation, a host manager appliance can be used at the enterprise location to manage access to the desktop hosts by the resource management appliance. In the description above, where the resource management appliance communicates with the desktop host, such communication can occur directly with the desktop host or indirectly through a host manager application. The host manager appliance provides an application programming interface (API) through which the resource manager appliance can communicate to multiple different desktop host machines at the enterprise location.

Having now described an example implementation, a general purpose computer in which components of such a system can be implemented will now be described. The following description is intended to provide a brief, general description of a suitable computer with which components of this system can be implemented. The system can be implemented with numerous general purpose or special purpose computing hardware configurations. Examples of well-known computers that may be suitable for any given component include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

FIG. 6 illustrates an example computer 600. A computer 600 typically includes at least one processing unit 602 and memory 604. The computer may include multiple processing units and/or additional co-processing units such as graphics processing unit 620. Memory 604 may be volatile (such as RAM), non-volatile (such as ROM, flash memory, etc.) or some combination of the two. This configuration is illustrated in FIG. 6 by dashed line 606.

Computer 600 may include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer program instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computer 600. Any such computer storage media may be part of computer 600. A storage medium is any addressable medium in which data can be stored in and retrieved from physical storage locations by the computer.

Computer 600 may also contain communications connection(s) 612, which are interface devices that allow a computer to connect to and communicate with other devices over a communication medium. By way of example, and not limitation, communication media includes wired media such as a wired network or direct-wired connection, and wireless media such as acoustic, RF, infrared and other wireless media.

Computer 600 may have various input device(s) 614 such as a keyboard, mouse, pen, camera, touch input device, and so on. Output device(s) 616 such as a display, speakers, a printer, and so on may also be included. All of these devices are well known in the art and need not be discussed at length here.

The various components in FIG. 6 are generally interconnected by an interconnection mechanism, such as one or more buses 630.

Components of such a system may be implemented using specially designed hardware components using software on a general purpose programmable computer, including computer-executable instructions and/or computer-interpreted instructions, such as program modules, being processed by the computer. Generally, program modules include routines, programs, objects, components, data structures, and so on, that, when processed by a processing unit, configure the computer to perform particular tasks or implement particular abstract data types or implement particular components. This system may be practiced in distributed computing environments where tasks are performed by remote processing devices that are linked through a communications network. In a distributed computing environment, program modules may be located in both local and remote computer storage media including memory storage devices.

It should be understood that the subject matter defined in the appended claims is not necessarily limited to the specific implementations described above. The specific implementations described above are disclosed as examples only.

What is claimed is:
1. A computer system comprising:
   a service provider management system on a service provider computer network, the service provider management system including a resource management system;

a plurality of enterprise computer networks, each enterprise computer network being a private tenant network distinct from each other enterprise computer network and distinct from the service provider computer network, each enterprise computer network being associated with a corresponding tenant and wherein each enterprise computer network includes one or more desktop hosts residing on the respective enterprise computer network and connected through a firewall to a publicly accessible computer network, wherein each desktop host is configured to support one or more virtual desktops residing on the respective enterprise computer network;

the resource management system connecting to the one or more desktop hosts on each of the plurality of enterprise computer networks, such connection enabling the resource management system to provision virtual desktops for each particular tenant on the one or more desktop hosts, wherein the virtual desktops for a particular desktop host are provisioned using resources on the corresponding enterprise computer network behind the firewall with respect to the publicly accessible computer network and the service provider computer network, the resource management system at the service provider management system being configured to provide provisioning instructions to the one or more desktop hosts residing on respective enterprise computer networks through the connection to the respective enterprise computer networks in response to management instructions of the service provider management system, wherein the provisioning instructions provide instructions for provisioning the virtual desktops hosted by the respective one or more desktop hosts residing on the respective enterprise computer networks, and wherein the service provider management system is in communication with the resource management system to track resources available for the respective enterprises;

the virtual desktops being accessible by client computers associated with a particular tenant over the corresponding enterprise computer network and over the publicly accessible computer network though a virtual private network extending the corresponding enterprise computer network, the virtual desktops being used by users on the client end points to access the resources on the enterprise computer network.

2. The computer system of claim 1, wherein the connection of the resource management system to the one or more desktop hosts is through a virtual private network extending the service provider computer network.

3. The computer system of claim 1, wherein the resource management system is located on the enterprise computer network and connects directly to the one or more desktop hosts on the enterprise computer network.

4. The computer system of claim 1, further comprising:
a tenant appliance located at the service provider data center, the tenant appliance tracking information about desktops allocated on the desktop hosts.

5. The computer system of claim 4, further comprising:
a desktop manager connected to the desktop hosts, the desktop manager communicating the information about the desktops to the tenant appliance.

6. The computer system of claim 4, further comprising:
a first desktop manager connected to the desktop hosts at a first location of a tenant, the desktop manager communicating the information about the desktops to the tenant appliance;

a second desktop manager connected to the desktop hosts at a second location of a tenant, the desktop manager communicating the information about the desktops to the tenant appliance; and wherein the tenant appliance aggregates the information from the first and second desktop managers for the tenant.

7. The computer system of claim 1, further comprising a host manager providing an interface through which the resource management system connects to the one or more desktop hosts.

8. A system for supporting virtual desktops, comprising:
at least one network connection for coupling each of a plurality of enterprise computer networks and a management computer network of a service provider computer system through a public network, wherein each enterprise computer network is a private computer network of a corresponding enterprise that is distinct from the service provider computer network;

a desktop host located on one of the plurality of enterprise computer networks, the desktop host being responsive to instructions from a resource management system of the service provider computer system and received over the management computer network for provisioning virtual desktops on the desktop host, wherein the virtual desktops are provisioned with resources on the corresponding enterprise computer network located behind a firewall separating the enterprise computer network from the public network and the management computer network;

each virtual desktop hosted on the desktop host located on the enterprise computer network being configured to be accessed by client end points associated with the enterprise and connected to the enterprise computer network.

9. The system of claim 8, wherein the enterprise computer network and the management computer network are separate networks with separate physical network connections.

10. The system of claim 8, wherein the enterprise computer network and the management computer network are the same computer network.

11. The system of claim 10, wherein the resource management system resides on the enterprise computer network and is responsive to instructions received from a service provider management appliance to instruct the desktop host to provision the virtual desktops.

12. The system of claim 10, further comprising a host manager providing an interface to receive the instructions from the resource management system to provision the virtual desktops.

13. A method of managing a desktop hosting environment using a network communication protocol, the method comprising:
for each enterprise of a plurality of enterprises:
configuring a desktop host on a local area computer network of the enterprise, wherein the local area computer network is a private computer network of the enterprise;

configuring a management appliance on a service provider computer network, wherein the service provider computer network is distinct from the local area computer network, and residing outside a firewall of the local area computer network;

reporting, by the desktop host, to the management appliance, over the communication connection, information about status and available capacity of the desktop host; and receiving instructions from the management appliance on the service provider computer network, to provision virtual desktops on the desktop host using resources on the local area computer network of the enterprise, wherein the hosts for the provisioned virtual desktops reside on the local area computer network of the enterprise distinct from the service provider computer network and are accessible by client devices of the enterprise.

14. The method of claim 13, further comprising:
reporting to the management appliance status of virtual desktops on desktop host.

15. The method of claim 13, further comprising:
the management appliance receiving a request to allocate a virtual desktop to a user device;
allocating a virtual desktop on the desktop host to the user device;
providing a network address to the user device for accessing the virtual desktop.

16. The method of claim 15, wherein the virtual desktops use a network communication protocol to establish computer network connection with a tenant or desktop manager appliance, the method comprising:
allocating an internal network address for the tenant appliance being one of a plurality of tenant appliances on the computer network which manage a plurality of virtual desktops on the remote desktop host over a virtual private network connection;
establishing a persistent network connection between the virtual desktops and the tenant appliance; and
reporting to the tenant appliance over the persistent network connection as to the session status and power state of each virtual desktop.

17. The method of claim 13, further comprising configuring the remote desktop host to provision and manage desktops on a segment of a virtual network that is co-resident to the remote desktop host, the network segment including services comprising domain name services, dynamic host configuration protocol services, gateway services and directory services.

18. The method of claim 13, further comprising configuring an access gateway to enable direct access to the virtual desktop when the user device is not on the enterprise computer network.

19. The method of claim 18, further comprising:
a tenant appliance receiving a connection request from the user device across the computer network for a desktop allocation;
the tenant appliance sending a configuration request to grant access to the virtual desktop from that user device;
the tenant appliance returning network connection information for the virtual desktop to the endpoint device; and
the endpoint device connecting to the virtual desktop via the access gateway.

20. The method of claim 13, wherein receiving instructions comprises:
a resource management appliance on an enterprise computer network receiving, through a gateway on a public network an instruction from a service provider management appliance on a server provider computer network;
the resource management appliance provide the instruction to a host manager appliance providing an interface to the desktop host.

* * * * *